United States Patent [19]

Korgaonkar

[11] 4,373,235
[45] Feb. 15, 1983

[54] PIPE CLAMP

[76] Inventor: Jaising Korgaonkar, 158 Christie St., Toronto, Ontario, Canada, M6G 3B4

[21] Appl. No.: 340,375

[22] Filed: Jan. 18, 1982

[51] Int. Cl.³ .............................................. F16L 19/02
[52] U.S. Cl. .................................... 24/285; 24/282; 24/284; 403/344
[58] Field of Search .............. 24/20 LS, 24, 285, 284, 24/249 R, 249 LS, 282; 403/344; 285/111, 365, 366, 367, 373, 410, 419, 420, 112, 411

[56] References Cited

U.S. PATENT DOCUMENTS

| 519,312 | 5/1894 | Arthur | 24/282 |
| 664,390 | 12/1900 | Durham | 24/282 |
| 918,078 | 4/1909 | McCaffrey | 403/344 |
| 1,505,255 | 8/1924 | Gold | 24/284 |
| 1,509,022 | 9/1924 | Noble | 24/285 |
| 1,928,316 | 9/1933 | Muto | 285/373 |
| 3,023,036 | 2/1962 | Taylor | 403/344 |
| 3,251,615 | 5/1966 | Short | 24/284 |
| 3,476,410 | 11/1969 | Pastra | 285/365 |
| 3,964,773 | 6/1976 | Stade et al. | 285/112 |

FOREIGN PATENT DOCUMENTS 974862 11/1964 United Kingdom ............... 24/284

Primary Examiner—Gene Mancene
Assistant Examiner—Kris R. Schulze

[57] ABSTRACT

The present invention includes a clamping system comprising two identical clamping components, which cooperate to form a clamp. One end of the clamp component is provided with a male and a female connector such that in the assembled clamping system the male component of one clamp component mates with the female component of the other clamp component to form a pivotal connection. This pivotal connection allows the opposite ends of the clamp components to be separated to allow the clamp to be placed over an object to be clamped, such as a pipe, while still maintaining the pivotal connection. The clamping system, according to the present invention, is simple in structure, simplifies the production and packaging operation, and is more convenient to use. The present invention may also function as a coupling. In this coupling function, two pipes or two such elements would be coupled to each other by this invention, so as to create a continuous mechanical and/or hydraulic system.

12 Claims, 4 Drawing Figures

PIPE CLAMP

FIELD OF THE INVENTION

The present invention relates to mechanical clamping arrangements. In particular, the invention relates to a clamping system which utilizes two essentially identical components.

BACKGROUNDS OF THE INVENTION

Various clamping systems have been proposed in the past which simplify the securement of the components about an object to be clamped and such as a hose or pipe and are convenient to use. In such a system, it is common to have a male connection on one component with the other clamping component having a female connection. When engaged, a type of adjustable connection is formed allowing the clamping system to be applied about a pipe. As one can appreciate, this requires the production of two distinctly different clamping components as well as production control to assure that the components are properly paired for packaging.

It is also known to produce a clamping system for industrial pipe application comprising two semi-circular clamp components secured together by bolts passing through the plunged ends of respective components. This type of system functions satisfactorily; however, in some circumstances it is difficult to secure. Furthermore, securement of the clamp requires two bolts to be tightened which can be time consuming where a number of clamps are used.

The present invention seeks to mitigate these problems by providing a clamping system in which two essentially identical components are utilized with the components adapted to cooperate to form a pivotal connection, simplifying the assembly of the clamping system about an object to be clamped.

SUMMARY OF THE INVENTION

The clamp component of the present invention is shaped for partial application about an object to be clamped when used in combination with a similar component, with each component having a first and second end portion. The first end portion includes a stud means and stud receiving means positioned to allow two of these components to cooperate and form at least a limited pivotal connection which also constrains the components relative to each other. This pivotal connection is established by inserting the stud means of each component into the stud receiving means of the other component. The second end portion of each component is adapted for mechanical connection with one another, such that these components may be pulled together and grip the object to be clamped.

According to a preferred aspect of the invention, the components of the clamping system have a semi-circular surface for clamping about a pipe. Each of the components has a stud receiving means and stud means, wherein the stud receiving means of one component is shaped to receive the stud means of the other component to form a pivotal connection about one end of the components. This pivotal connection facilitates application of the clamping system about a pipe and the opposite ends of each component are adapted for cooperation with a means for engaging them to secure the clamping system about a pipe.

According to yet a further aspect of the invention, the clamping system has two essentially identical semi-circular components is disclosed with each component having a flange end and an end adapted for hinge connection with the other component. The end adapted for hinge connection includes a female and a male connector located to opposite sides of the semi-circular component whereby the male connectors cooperate with the female connectors of the other component to define a hinge connection. This hinge connection facilitates application of the clamping system about an object to be clamped, which also constrains the components relative to each other.

The clamping components and the clamping system of the present invention utilize two components of essentially identical shape which cooperate with one another to provide a simple means a creating a pivotal connection between the components, thereby simplifying the securement of the clamping systems about a pipe or other object to be clamped. The opposite ends of these components are flanged and can be mechanically connected in any suitable fashion, preferably by a bolt and nut.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
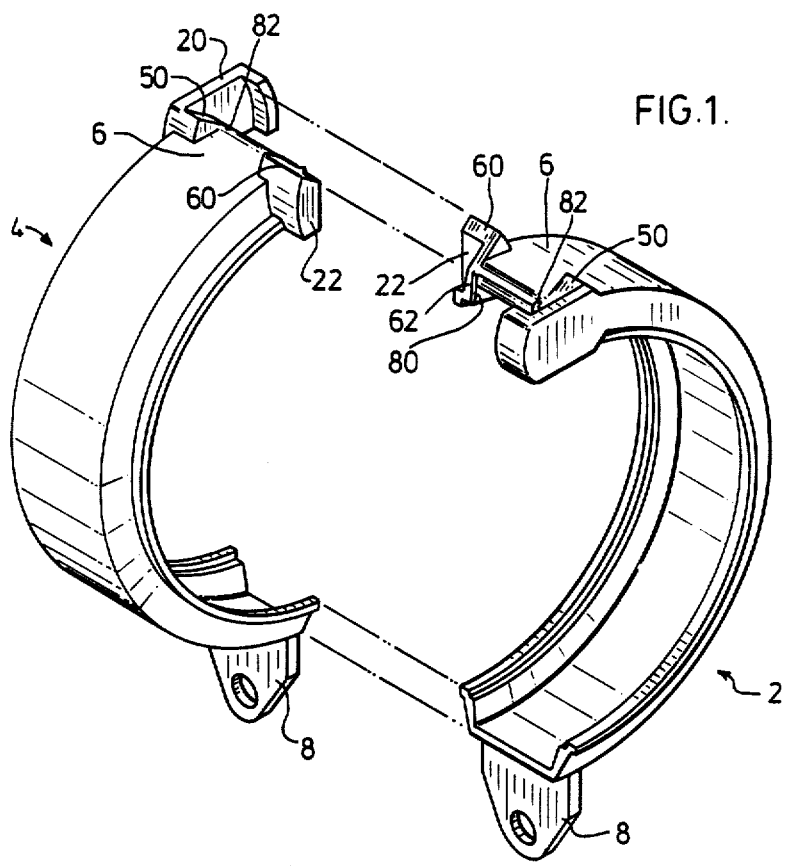
FIG. 1 is an exploded perspective view of the clamping system according to the present invention.

The clamping system, as shown in FIG. 1, utilizes two essentially identical semi-circular components 2 and 4 each having an end 6 adapted for pivotal connection with a similar component and a flange connection end 8. The pivotal end connection 6 includes a female component 20 and a male component 22. Component 22 is a stud which projects from the sidewall of the semi-circular clamping component and female connection 20 is a bracket projecting from the other sidewall of the clamping component and sized for receiving a stud of a similar clamp component. In reversing the components for application about a pipe, the stud means or male component 22 of one component aligns with the stud receiving means or female component 20 of the opposite semi-circular component, with the stud means and the female receiving means shaped to allow pivotal movement of the semi-circular components about end 6 and in the plane of the clamping components.

Figure 2:
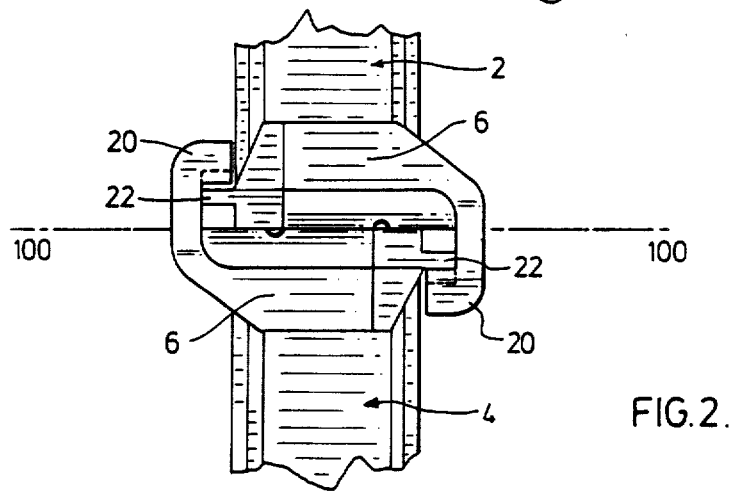
FIG. 2 is a partial top view showing two identical clamping components cooperating to form a pivotal connection.
Figure 3:
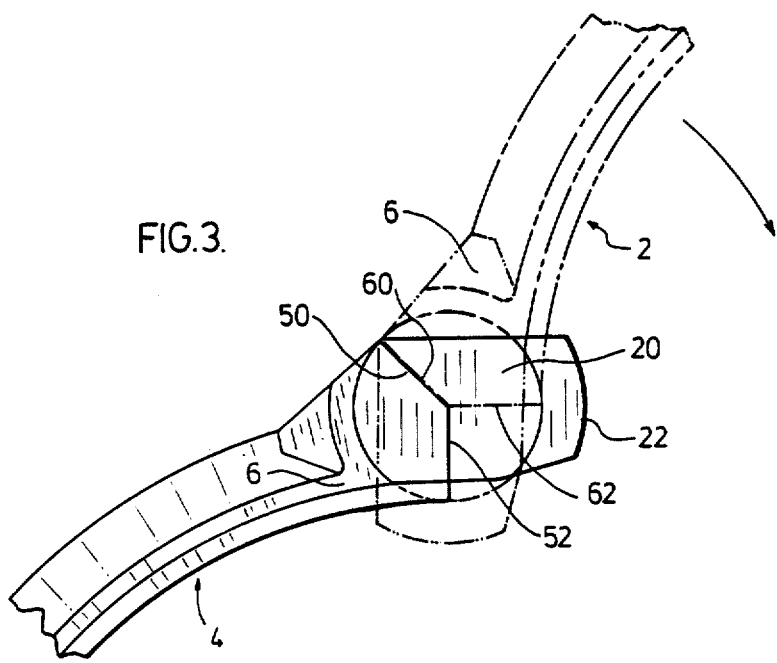
FIG. 3 is a side view of two cooperating clamping components pivoted to the wide open position.
Figure 4:
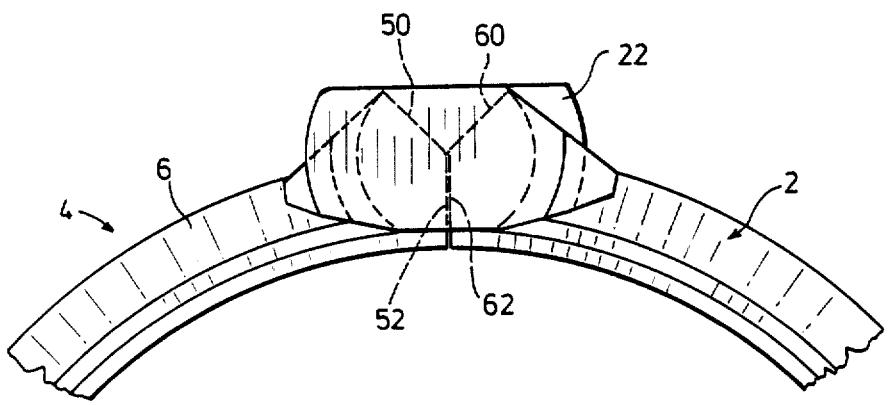
FIG. 4 is a partial sideview similar to FIG. 3 with the clamping components pivoted to the closed position.

As can be seen in FIG. 2, two components 6 have been interlocked to define a hinge axis shown by line 100 which passes between the end components 6 of two similar components. According to the embodiment shown in FIG. 2, the stud means or male component 22 of clamp component 4 is located below the top periphery of component 6, whereas the female means 20 defines the top periphery of component 6. When a similar component is reversed and connected with another component, the location of the female component and the male component is such that they align with corresponding male or female components of the other member to thereby define the hinge axis 100. Therefore, in application of this system about a pipe, it can be appreciated that the components 2 and 4 may be placed on either side of the pipe and brought together to form the hinge connection about ends 6 of the components. Because of this hinge connection, the distance between the flanged ends 8 of the components can be quite great, as shown in FIG. 3, allowing the pipe to pass through these end portions with the clamping system subsequently closing about the pipe.

With the hinged connection complete and the components 2 and 4 placed about a pipe, a bolt may be passed through the apertures 30 and 32 of the components to cooperate with the nut and tighten the clamping system about a pipe.

Although this system can be adapted for use in a variety of sizes, it is particularly useful in large industrial type clamps, where the clamp components 2 and 4 are normally channel-shaped in cross-section with a rubber sealing member being insertable within the channel. Large pipes are joined by providing a groove adjacent the end of each pipe positioned for engagement with the edge of the channel to hold the pipes in alignment and minimize relative movement of the pipes in the longitudinal direction. A positive seal may be provided with the sealing member surrounding abutting ends of the pipes and being squeezed inwardly by the clamping components. In this application, it is necessary that the clamping system be of high inherent strength and components 2 and 4 are cast as finished items. The male and female components, as shown, are simple in design, strong and easily cast, thus making the design suitable for large scale production and application. However, it can be appreciated that in other applications it may not be necessary to have this high inherent strength and the male and female connectors at the end of the semi-circular components could indeed be smaller and of a different shape. For example, the male component could merely be a circular stud with its axis essentially along the end of the component with the female component being a bracket with an aperture for receiving the circular stud. Where the clamp is large, it is preferable that the stud means be located below the top periphery of the end 6 of the semi-circular components with the female component located above this periphery. Such an arrangement facilitates connection of the components.

The invention described to this point has shown the male and female components secured to the sidewalls of the channel members to define a hinge axis adjacent the top periphery of end 6 of the components; however, it is also possible that these connectors could be located on the top of the bracket as opposed to the sides. In this case, the hinge connection would be behind the ends 6 of the components and a sufficient clearance would have to be provided to avoid butting of the ends of the channels during pivotal movement of the clamping system. However, in certain applications, this may be acceptable.

With reference to FIGS. 1 and 3, positive stops are provided which limit the extent to which cooperating clamping components can pivot. To the interior of female component 20 is a slanted face 50 which is positioned and angled to cooperate with surface 60 on the male connector 22. When the clamp components are opened, as shown in FIG. 3, these surfaces about either side of the clamps, thereby providing a positive stop. In the fully closed position, face 62 strikes face 52 of the female connector to provide a stop. Furthermore if desired, alignment means may be provided on surfaces 52 and 62. These alignment means could take the form of peg 82 and depression 80, one on each surface which cooperates to align and constrain cooperating clamping components when moved to the closed position. Many alignment means are possible and need not be limited to the peg and depression shown. In the case of channel shaped clamped members, alignment means are not necessary where the channel members are adapted to cooperate with grooves adjacent the ends of the pipes, as such cooperation ensures alignment is maintained.

As can be appreciated, the clamping component 2, as shown in FIG. 1, is essentially identical with the component 4 and, as such, can be produced by the same equipment. This greatly simplifies the manufacturing operation and also simplifies the packaging of the product. As both components are identical, it is not necessary to have a right and left clamping member as the right clamping member is identical to the left clamping member and, as such, the clamping system can be complete with two clamping components. Such an arrangement simplifies production of the components, packaging of the components and replacement of the components.

The invention has been particularly described with reference to pipe application; however, it is also useful for joining shafts and rods. Furthermore, the parts to be secured need not be round in cross-section and the particular shape of the interior of the components adapted for the particular application. The components of the clamping system may be cast, stamped or rolled.

Although the invention has been described herein in detail, it will be understood by those skilled art that variations may be made thereto without departing from the spirit of the invention or the scope of the appended claims.

The embodiments of the invention in which an exclusive property or privilege is claimed are defined as follows:

1. A clamp component of a clamping system, said component having first and second end portions, the first end portion having a stud means and stud receiving means, wherein two of said components can cooperate and form at least a limited pivotal connection by inserting the stud means of each component in the stud receiving means of the other component and wherein the second end portion of each component may be mechanically connected for securing the components about an object to be clamped.

2. A clamp component as claimed in claim 1, having a generally channel-shaped cross-section, the interior of which is adapted to receive a circular sealing member, said stud receiving means including a bracket channel to one side of the end of said component, said bracket having a curved interior surface, said stud means projecting from the opposite side of the end portion and having a surface at least partially corresponding to the curved interior surface of said bracket to allow pivotal movement of two cooperating components.

3. A clamp component as claimed in claim 1, further including alignment means for limiting the movement of two components placed in pivotal connection.

4. A clamping system having two clamp components as claimed in claim 1 or 2, which are essentially identical and further including mechanical means for securing the second end portions of two components which are pivotally connected.

5. A clamp component as claimed in claim 1, 2 or 3, wherein said second end portion is flanged outwardly and adapted to have a bolt and nut to cooperate with said flange to secure two of the said components and further including alignment means for limiting movement of cooperating components when secured.

6. A clamp component as claimed in claim 1, 2 or 3 which is cast.

7. A clamping system comprising two components having essentially semi-circular interior surfaces for clamping about a pipe, each component having stud receiving means and stud means wherein the stud receiving means of one component is shaped to receive the stud means of the other component to form a pivotal connection about one end of said components to secure one side of said components for application of said clamping system about a pipe, said system further including means for engaging the other end of said components to secure said clamping system about such pipe.

8. A clamping system as claimed in claim 7, wherein said clamping components are channel shaped in cross-section.

9. A clamping system as claimed in claim 7 or 8, further including a sealing member adapted to be received within the channel in said components.

10. A clamping system as claimed in claim 7 or 8, wherein said engaging means includes a flange on each component generally opposite said stud means and said stud receiving means, said flange being shaped to cooperate with a bolt and nut for tightening said clamp about a pipe.

11. A clamping system having two essentially identical semi-circular components, each component having a flanged end and an end adapted for hinge connection with the other component, said end adapted for hinge connection having a female connector and a male connector located to opposite sides of said semi-circular component whereby the male connectors cooperate with the female connectors of the other semi-circular component defining a hinge connection between two cooperating components for application of said clamping system about an object to be clamped.

12. A clamping system as claimed in claim 7, 8 or 11, wherein said components are cast.

* * * * *